United States Patent Office 3,321,329
Patented May 23, 1967

3,321,329
METHOD OF FORMING A TRAFFIC LINE
Eduard R. de Vries, Flemington, N.J., assignor to Prismo Safety Corporation, Huntingdon, Pa., a corporation of Pennsylvania
No Drawing. Filed Nov. 26, 1963, Ser. No. 326,264
6 Claims. (Cl. 117—105.2)

The present invention is directed to a method of forming highway traffic lines and more particularly to a method of flame spraying highway paint.

Until the present time it has been conventional in the art of forming highway traffic lines to spray traffic paint on the highway and to permit the volatile solvents in the paint to evaporate into the air without using heat to force evaporation. This procedure has proven unsatisfactory primarily because traffic lines of only a very limited thickness can be deposited and also because even such thin lines require a great deal of time to dry thus requiring the lines to be protected to prevent cars from running thereover.

More recently it has been attempted to hot spray these road paints by heating the paint and then spraying the paint in heated condition onto the road. While this procedure improves the rate of drying it is still not entirely satisfactory.

It has also recently been attempted to spray road paints containing two component liquid thermosetting binders. These do not dry quickly enough because of the slow rate of cure of most catalyzed thermosetting binders. Increasing the rate of cure of these systems has proven impractical because of the necessity of having a long pot life for the paint; thus, if the rate of cure is increased, the pot life becomes so short that the material cannot be sprayed shortly after mixing. While the two liquid components may be mixed automatically just prior to or during spraying by utilizing relatively complex machinery, this procedure and machinery has been proven impractical for the spraying of traffic lines.

It is therefore an object of the present invention to provide a method of forming a highway traffic line by flame spraying a novel traffic line paint.

It is another object of the present invention to provide a novel traffic line paint which is inexpensive, durable and which dries quickly.

It is another object of the present invention to obviate the problems indicated above in the prior art.

It is yet another object of the present invention to provide a flame spraying method which is effective, yet simple and inexpensive and which provides a fast drying traffic line.

These and other objects as well as the nature of the invention will become apparent from the following detailed description.

The objects of the present invention in the formation of a highway traffic line are obtained by forming a mixture of a solid curable resin, a catalyst, preferably in the form of a second resinous binder, a pigment and a volatile and a non-flammable organic solvent and by spraying such a mixture through a flame and onto the surface of the highway. The flame effects evaporation of the organic non-flammable solvent and also initiates curing of the resin by increasing the rate of reaction between the catalyst and the thermosetting curable resin.

Flame spraying itself is well known, being carried out by spraying finely divided thermoplastic resinous powder through a flame so that the powder melts temporarily and forms a continuous coating on the surface upon which the powder is sprayed. The process of the present invention may utilize the same spray guns used in conventional flame spraying.

The present invention involves the spraying of a fast evaporating and non-flammable organic solvent which, together with the flame-spraying, gives rise to rapid drying time. If the organic solvent is non-combustible and fast evaporating, it can be used in conjunction with the spraying of a curable thermosetting resin (the paint binder). This provides for the flame-spraying of a liquid material, instead of the conventional powdered material. Because of high temperatures of the flame, most of the solvent is flashed off immediately. Since the thermosetting curable resin used as a binder in the paint is used in the solid state and is reduced to a liquid for spraying only by the organic solvent, the flashing off of the solvent during flame spraying causes the paint to solidify even before it hits the road. It has been surprisingly found that the essentially solidified paint strongly adheres to the road in spite of its essentially solid nature. The heat from the flame also initiates curing of the resin which will be fully cured in a matter of a few hours. However, because of the solid nature of the resin, the paint can be driven over by traffic within a few minutes after spraying. The largest part of the solvent will flash off in the flame. The heat from the flame and the retention of a small part of the strong solvent will cause the resinous binder to be liquid just long enough so that adequate flow of the coating takes place to ensure wetting and adhesion to the road surface.

The catalyst should preferably be a solid such as Versamid resin which can contribute to the resinous binder. A resinous binder as catalyst is also desirable since it is the binder of the pigmented second liquid component and is necessary for pigment wetting and nonsetting.

The mixture of a non-flammable solvent and a curable catalyzed resin is particularly easy to make since no powder need be made by forming a melt which then has to be solidified and pulverized. In addition, the spraying of a powder in the formation of road traffic lines would make it very difficult to arrive at any line definition, which is obviously necessary for traffic lines.

It has thus been found that a pigmented two-component epoxy Versamid paint having epoxy resin in one component and Versamid catalyst in the other immediately prior to mixing and containing only methylenechloride as a solvent will dry extremely rapidly when utilizing a flame-spraying principle. When such a composition is sprayed without flame immediately after mixing the two separate liquid components, the coating produced will be soft and tacky in excess of two hours; the same formulation flame-sprayed will dry in a matter of minutes. Because of the rapid elimination of solvents when utilizing the present invention, coatings of very high thicknesses can be deposited without solvent retention.

The following examples are illustrative of the present invention:

EXAMPLE I

| Component | Materials | Parts by Weight |
|---|---|---|
| 1 | Solid Epoxy Resin (Epon 1001) | 150 |
| | Solvent (Methylene Chloride) | 100 |
| 2 | Pigment (Titanox RA-50) | 150 |
| | Filler (Celite 281) | 150 |
| | Filler (Calcium Carbonate) | 400 |
| | Curing Agent (Versamid 115) | 100 |
| | Curing Agent (Versamid 950) | 50 |
| | Solvent (Methylene Chloride) | 280 |
| | Glass Beads (No. 3 Road Spheres) | 454 |

The above two components are thoroughly mixed to form a paint dispersion and are then placed within a conventional flame spraying device. The liquid paint is sprayed onto a road surface as a center line in varying thicknesses. Regardless of the thickness of the deposit the center line is sufficiently dry after three minutes to permit traffic to drive over without smearing.

EXAMPLE II

Materials: Parts by weight
- Pigment (Titanox RA–50) -------------------- 150
- Filler (Celite 281) ------------------------ 150
- Filler (Calcium Carbonate) ----------------- 400
- Solid epoxy resin (Epon 1001) -------------- 150
- Curing agent (Versamid 115) ---------------- 65
- Curing agent (Versamid 950) ---------------- 15
- Solvent (Methylene Chloride) --------------- 310

The above composition was mixed and sprayed as indicated above in Example I. Laboratory work indicated that the composition showed promise as traffic lines.

Although a solid epoxy is the preferred plastic binder, it has been found that other materials such as polyurethanes and polyesters could also be used.

The proper selection of a solvent is critical to the present invention. It has been found that methylene chloride is ideal, being inexpensive, non-flammable and capable of dissolving solid epoxy resins. While it is preferred that the solvent be capable of dissolving the resins, the most important features of the solvent are that it be capable of quickly volatilizing and be non-flammable. Thus, any organic diluent, whether it dissolves the binder or merely disperses it in very small particles, may be used, so long as it may quickly volatilize and yet be non-flammable.

Mixtures of desirable solvents are also useful, and small proportions of other diluents, even those which are flammable, such as toluol or naphtha, may be used with large proportions of non-flammable solvents. Thus, a solvent mixture of 90% methylene chloride and as much as 10% naphtha has been found to be useful.

When using epoxy resin as the binder, and methylene chloride as the solvent, it is preferred but not essential that the composition be maintained within the following proportions:

Materials: Parts by weight
- Pigment (such as TiO₂ and other hiding pigments) ---------------------------- 50– 200
- Extender pigment ------------------------ 50– 800
- Solid epoxy resin ----------------------- 50– 200
- Curing agent or catalyst ---------------- 10– 200
- Methylene chloride ---------------------- 100–1000
- Glass beads ----------------------------- 0–2000

It will be obvious to those skilled in the art that various changes may be made without departing from the scope of the invention and therefore the invention is not limited to what is described in the specification but only as indicated in the appended claims.

What is claimed is:

1. A method of forming a highway traffic line comprising (a) forming a traffic line paint mixture comprising a solid curable thermosetting resin, a catalyst, a pigment, and a volatile and non-flammable organic diluent and (b) spraying said mixture through a flame and onto the surface of a highway, said flame effecting evaporation of the major portion of said organic diluent prior to coating and initiating curing of said resin.

2. A method in accordance with claim 1, wherein said line paint mixture is formed by first mixing solid resin and diluent to form a first component and mixing pigment, catalyst and diluent to form a second component, and then mixing said first and second components prior to spraying.

3. A method in accordance with claim 1, wherein said organic diluent is a solvent for said resin.

4. A method in accordance with claim 3, wherein said solvent is a chlorinated organic compound.

5. A method in accordance with claim 3, wherein said solvent is methylene chloride and said resin is an epoxy resin.

6. A method in accordance with claim 1, wherein said catalyst is a resinous binder.

References Cited by the Examiner

UNITED STATES PATENTS

| | | | |
|---|---|---|---|
| 1,986,591 | 1/1935 | Mayer | 88—82 |
| 2,320,255 | 5/1943 | Bacon et al. | 117—105.2 |
| 2,716,075 | 8/1955 | Wiese | 117—46 |
| 2,868,767 | 1/1959 | Cyba et al. | 260—33.8 |
| 2,952,192 | 1/1960 | Nagin | 88—82 |
| 2,958,609 | 11/1960 | Stoll et al. | 117—105.2 |
| 3,028,257 | 4/1962 | Svrcheck et al. | 117—105.2 |
| 3,171,827 | 3/1965 | Devries et al. | 88—82 |
| 3,261,808 | 7/1966 | Schnell et al. | 260—33.8 |

ALFRED L. LEAVITT, *Primary Examiner.*

A. H. ROSENSTEIN, *Assistant Examiner.*